(12) United States Patent
Qiu et al.

(10) Patent No.: US 10,740,289 B2
(45) Date of Patent: Aug. 11, 2020

(54) METHOD AND APPARATUS FOR STORING DATA

(71) Applicant: Siemens Aktiengesellschaft, Munich (DE)

(72) Inventors: Wei Qiu, Beijing (CN); Chen Yu, Wuhan (CN); Jia Jie Zhang, Wuhan (CN); Rui Guo Zhang, Wuhan (CN)

(73) Assignee: Siemens Aktiengesellschaft, Munich (DE)

( * ) Notice: Subject to any disclaimer, the term of this patent is extended or adjusted under 35 U.S.C. 154(b) by 335 days.

(21) Appl. No.: 15/666,617

(22) Filed: Aug. 2, 2017

(65) Prior Publication Data
US 2018/0046638 A1 Feb. 15, 2018

(30) Foreign Application Priority Data
Aug. 12, 2016 (CN) .......................... 2016 1 0665593

(51) Int. Cl.
*G06F 16/00* (2019.01)
*G06F 16/13* (2019.01)
(Continued)

(52) U.S. Cl.
CPC .............. *G06F 16/13* (2019.01); *G06F 3/067* (2013.01); *G06F 3/0608* (2013.01);
(Continued)

(58) Field of Classification Search
CPC ...... G06F 16/13; G06F 16/182; G06F 16/152; G06F 3/0608; G06F 3/0659; G06F 3/067
(Continued)

(56) References Cited

U.S. PATENT DOCUMENTS

| | | | | |
|---|---|---|---|---|
| 6,418,448 B1 * | 7/2002 | Sarkar | ................... | G06F 16/972 |
| 7,836,119 B2 * | 11/2010 | Lucas | ....................... | G06F 8/38 |
| | | | | 709/201 |

(Continued)

FOREIGN PATENT DOCUMENTS

CN 102999563 A 3/2013

OTHER PUBLICATIONS

W3C, "Resource Description Framework (RDF) Model and Syntax Specification", W3C Recommendation, Feb. 22, 1999, 45 pages.*
(Continued)

*Primary Examiner* — Monica M Pyo
(74) *Attorney, Agent, or Firm* — Harness, Dickey & Pierce, P.L.C.

(57) ABSTRACT

A method includes receiving Resource Description Framework (RDF) data to be stored; obtaining triplet information including at least a resource name of the resource, attribute of the resource, and attribute value of the resource represented by the RDF data; obtaining from the RDF data a first namespace usable in a resource name of the resource; searching for a resource identification corresponding to a resource name and first namespace of the resource; obtaining from the RDF data a second namespace usable by the attribute of the resource; searching for the attribute identification corresponding to the attribute of the resource and the second namespace; and storing the triplet information, the resource name of a specific resource being represented by a resource identification and the attribute of the specific resource being represented by an attribute identification. Using an embodiment, it is possible to reduce the storage of redundant data, thereby saving storage space.

19 Claims, 8 Drawing Sheets

Drawings for Specification

(51) Int. Cl.
*G06F 16/14* (2019.01)
*G06F 16/182* (2019.01)
*G06F 16/25* (2019.01)
*G06F 3/06* (2006.01)

(52) U.S. Cl.
CPC .......... *G06F 3/0659* (2013.01); *G06F 16/152* (2019.01); *G06F 16/182* (2019.01); *G06F 16/258* (2019.01)

(58) Field of Classification Search
USPC ........................................................ 707/802
See application file for complete search history.

(56) References Cited

U.S. PATENT DOCUMENTS

| | | | |
|---|---|---|---|
| 10,394,862 B2* | 8/2019 | Song | |
| 2009/0234883 A1* | 9/2009 | Hurst | G06F 16/2471 |
| 2010/0036862 A1* | 2/2010 | Das | G06F 16/2255 |
| | | | 707/698 |
| 2010/0082651 A1* | 4/2010 | Akolkar | G06F 16/9024 |
| | | | 707/758 |
| 2012/0102472 A1* | 4/2012 | Wu | G06F 8/434 |
| | | | 717/137 |
| 2012/0150922 A1* | 6/2012 | Yalamanchi | G06F 16/24564 |
| | | | 707/812 |
| 2012/0150923 A1 | 6/2012 | Clark et al. | |
| 2015/0172320 A1* | 6/2015 | Colombo | H04L 63/20 |
| | | | 726/1 |

OTHER PUBLICATIONS

Codd E F: "A relational model of data for large shared data banks", Communications of the ACM. Association for Computing Machinery, Inc, United States, vol. 13. No. 6. Jun. 1, 1970 (Jun. 1, 1970), pp. 377-387. XP058151869: ISSN: 0001-0782. DOI: 10.1145/362384.362685; 1970.

Levien R E et al "A computer system for inference execution and data retrieve"; Communications of the ACM, Association for Computing Machinery, Inc, United States; vol. 10, No. 11, Nov. 1, 1967 (Nov. 11, 1967), pp. 715-721, XP058174868; ISSN: 0001-0782, DOI: 10.1145/363790.363817; 1967.

Extended European Search Report dated Jan. 4, 2018.

Office Action dated Apr. 10, 2020 in Chinese Application No. 201610665593.2.

Shen , JIAN_TONG: "The Expression of Resource Description Framework (RDF) Data in Relational Database" SCI-Tech Information Development & Economy pp. 139-140, published on Jul. 10. 2008.

* cited by examiner

Drawings for Specification

008# METHOD AND APPARATUS FOR STORING DATA

PRIORITY STATEMENT

The present application hereby claims priority under 35 U.S.C. § 119 to Chinese patent application number CN 201610665593.2 filed Aug. 12, 2016, the entire contents of which are hereby incorporated herein by reference.

FIELD

At least one embodiment of the present invention generally relates to the field of information technology and, more particularly, to a method and apparatus for storing data.

BACKGROUND

Resource Description Framework (RDF) is a specification standard language proposed by the World Wide Web Consortium (W3C) for describing web resource information, also a data model. An RDF model can be used to describe any resource and resource type on the network, thus providing a common framework for the representation of resource description.

However, as RDF is widely used in various fields, its data size is thus increasing and consequently storage of RDF data has also become an enormous challenge.

SUMMARY

At present, common RDF data storage methods include storage methods based on file systems, those based on memory, and those based on relational databases. However, due to the explosive growth of RDF data, users also have increasing requirements on the storage of the massive RDF data. Therefore, the inventors have recognized that improvement on traditional storage methods has become an urgent need.

In embodiments of the present invention, a method and apparatus are provided for storing data, which can greatly reduce the storage of redundant data, thereby saving storage space.

In one embodiment, a method for storing data of an embodiment according to the present invention comprises: receiving Resource Description Framework (RDF) data to be stored; obtaining triplet information from the RDF data to be stored; wherein the triplet information comprises three pieces of information: the resource name of a specific resource, the attribute of a specific resource, and the attribute value of a specific resource represented by the RDF data to be stored; obtaining from the RDF data to be stored a first namespace used by the resource name of the specific resource; searching for the resource identification corresponding to the resource name of the specific resource and the first namespace; obtaining from the RDF data to be stored a second namespace used by an attribute of the specific resource; searching for the attribute identification corresponding to the second namespace identification and the attribute of the specific resource; storing the triplet information, wherein the resource name of the specific resource is represented by a resource identification, and the attribute of the specific resource is represented by an attribute identification.

In another aspect, an apparatus for storing data according to an embodiment of the present invention, comprises:

a receiving device to receive Resource Description Framework (RDF) data to be stored;

an acquisition module for obtaining triplet information from the RDF data to be stored; wherein the triplet information comprises three pieces of information: the resource name of a specific resource, the attribute of a specific resource, and the attribute value of a specific resource represented by the RDF data to be stored; and a storage and processing module for obtaining from the RDF data to be stored a first namespace used by the resource name of the specific resource; searching for the resource identification corresponding to the resource name of the specific resource and the first namespace; obtaining from the RDF data to be stored a second namespace used by an attribute of the specific resource; searching for the attribute identification corresponding to the second namespace identification and the attribute of the specific resource; storing the triplet information, wherein the resource name of the specific resource is represented by a resource identification, and the attribute of the specific resource is represented by an attribute identification.

In another aspect, an apparatus for storing data according to an embodiment of the present invention comprises: a memory coupled to the processor for storing an executable instruction; the executable instruction, when executed in the processor, causes the processor to execute an embodiment of a method as described above.

In another embodiment, a computer-readable medium according to an embodiment of the present invention comprises a code for causing a computer to execute a method as described above.

BRIEF DESCRIPTION OF THE DRAWINGS

Other features, characteristics, advantages, and benefits of the present invention will become more apparent from the following detailed description of example embodiments taken in conjunction with the accompanying drawings.

Symbols used in the drawings.

Figure 1:
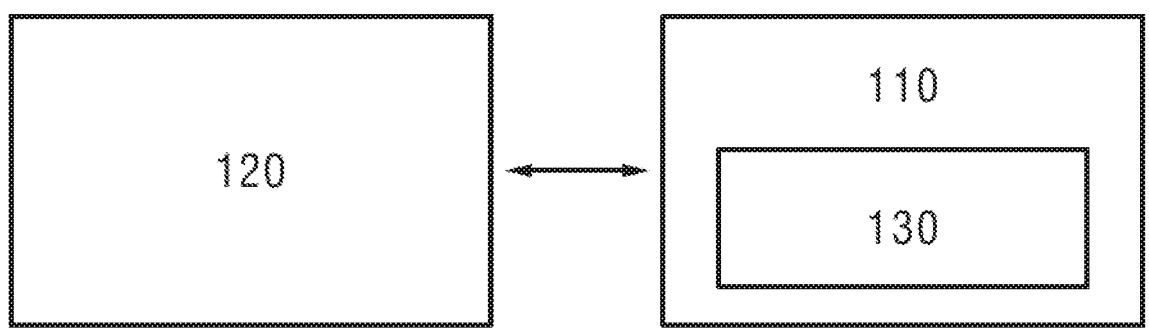
FIG. 1 is a schematic view of an example of the scenario in which an embodiment of the present invention can be applied.

| | |
|---|---|
| 110: Storage system | 120: Data acquisition device |
| 130: Relational database | 410: Resource description table |
| 4101: Statement_ID | 4102: Model _ID |
| 4103: Resource _ID | 4104: Attribute _ID |
| 4105: Attribute value | 420: Resource table |
| 4201: Resource name | 430: Attribute table |
| 4301: Attribute | 440: Namespace table |
| 4401: Namespace _ID | 4402: Namespace |
| 450: Long string attribute value table | 4501: Attribute value _ID |
| 4502: Attribute value | 510: Receiving module |
| 520: Acquisition module | 530: Storage and processing module |
| 610: Processor | 620: Memory |

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In one embodiment, a method for storing data of an embodiment according to the present invention comprises: receiving Resource Description Framework (RDF) data to be stored; obtaining triplet information from the RDF data to be stored; wherein the triplet information comprises three pieces of information: the resource name of a specific resource, the attribute of a specific resource, and the attribute value of a specific resource represented by the RDF data to be stored; obtaining from the RDF data to be stored a first namespace used by the resource name of the specific resource; searching for the resource identification corresponding to the resource name of the specific resource and the first namespace; obtaining from the RDF data to be stored a second namespace used by an attribute of the specific resource; searching for the attribute identification corresponding to the second namespace identification and the attribute of the specific resource; storing the triplet information, wherein the resource name of the specific resource is represented by a resource identification, and the attribute of the specific resource is represented by an attribute identification.

It is thus clear that, by searching for the resource identification and attribute identification respectively corresponding to a resource name and attribute, and by representing resource names and attributes respectively with the corresponding identifications when storing triplet information, the storage of redundant data can be reduced to save storage space.

In one embodiment, after searching for a resource identification corresponding to the resource name of the specific resource and the first namespace and before storing the triplet information, the method further comprises: if the resource identification corresponding to the resource name of the specific resource and the first namespace is not found, creating the resource identification and recording the correspondence relationship between the resource identification and the resource name of the specific resource and the first namespace; and/or after searching for the attribute identification corresponding to the attribute of the specific resource and the second namespace and before storing the triplet information, the method further comprises: if the attribute identification corresponding to the attribute of the specific resource and the second namespace is not found, creating the attribute identification and recording the correspondence relationship between the attribute identification and the attribute of the specific resource and the second namespace.

It is thus clear that, in this embodiment, whether there is a resource identification and/or attribute identification is checked; if the corresponding resource identification or attribute identification does not exist, an identification is created and recorded. Thus, during subsequent RDF data storage, if there is a resource name corresponding to the resource identification of the record or the attribute corresponding to the attribute identification of the record, the corresponding identification may be recorded; thus, the storage of redundant data can be reduced and storage space saved.

In another embodiment, after obtaining the triplet information and before storing the triplet information, the method further comprises determining whether the length of the attribute value of the specific resource is greater than a predetermined threshold value; if the attribute value of the specific resource is greater than the predetermined threshold value, searching for the attribute value identification corresponding to the attribute value of the specific resource; the storing the triplet information further comprises: storing the triplet information, wherein the attribute value of the specific resource is represented by the attribute value identification.

It can be seen that, in this embodiment, when triplet information is stored, an attribute value having a length greater than a predetermined threshold is represented by the corresponding attribute value identification, instead of direct storage of its specific contents; thus, storage space can be further saved.

In another embodiment, after searching for the attribute value identification corresponding to the attribute value of the specific resource and before storing the triplet information, the method further comprises: if the attribute value identification corresponding to the attribute value of the specific resource is not found, creating the attribute value identification and recording the correspondence relationship between the attribute value identification and the attribute value of the specific resource.

It can be seen that, in this embodiment, whether an attribute value identification already exists is checked; if there is no corresponding attribute value identification, an identification is created and recorded. Thus, during subsequent RDF data storage, if there is an attribute value corresponding to the attribute value identification of the record, the corresponding identification may be recorded; thus, the storage of redundant data can be reduced and storage space saved.

In another embodiment, after receiving the RDF data to be stored, the method further comprises: determining the type of the RDF data to be stored; storing the identification information of the type corresponding to the triplet information stored.

It is thus clear that, in this embodiment, by storing the identification information about the type of RDF data, during a search, RDF data can be quickly retrieved and screened by the identification information about the type; thus, the query efficiency can be improved.

In another embodiment, the searching for the resource identification corresponding to the resource name of the specific resource and the first namespace identification comprises: searching for the first namespace identification corresponding to the first namespace; searching for the resource identification corresponding to the first namespace identification and the resource name of the specific resource; and/or the searching for the attribute identification corresponding to the attribute of the specific resource and the second namespace identification comprises: searching for the second namespace identification corresponding to the second namespace; searching for the attribute identification corresponding to the second namespace identification and the attribute of the specific resource.

It is thus clear that, in this embodiment, by using a corresponding namespace identification to represent a resource name and/or the namespace used by an attribute, storage of redundant data can be reduced to further save storage space.

In another embodiment, an apparatus for storing data according to an embodiment of the present invention, comprises:

a receiving device to receive Resource Description Framework (RDF) data to be stored;

an acquisition module for obtaining triplet information from the RDF data to be stored; wherein the triplet information comprises three pieces of information: the resource name of a specific resource, the attribute of a specific resource, and the attribute value of a specific resource represented by the RDF data to be stored; and a storage and processing module for obtaining from the RDF data to be stored a first namespace used by the resource name of the specific resource; searching for the resource identification corresponding to the resource name of the specific resource and the first namespace; obtaining from the RDF data to be stored a second namespace used by an attribute of the specific resource; searching for the attribute identification corresponding to the second namespace identification and the attribute of the specific resource; storing the triplet information, wherein the resource name of the specific resource is represented by a resource identification, and the attribute of the specific resource is represented by an attribute identification.

It is thus clear that, by searching for the resource identification and attribute identification respectively corresponding to a resource name and attribute, and by representing resource names and attributes respectively with the corresponding identifications when storing triplet information, the storage of redundant data can be reduced to save storage space.

In an embodiment, the storage and processing module is further configured for: after searching for a resource identification corresponding to the resource name of the specific resource and the first namespace and before storing the triplet information, if the resource identification corresponding to the resource name of the specific resource and the first namespace is not found, creating the resource identification and recording the correspondence relationship between the resource identification and the resource name of the specific resource and the first namespace; and/or if the attribute identification corresponding to the attribute of the specific resource and the second namespace is not found, creating the attribute identification and recording the correspondence relationship between the attribute identification and the attribute of the specific resource and the second namespace.

It is thus clear that, in this embodiment, whether there is a resource identification and/or attribute identification is checked; if the corresponding resource identification or attribute identification does not exist, an identification is created and recorded. Thus, during subsequent RDF data storage, if there is a resource name corresponding to the resource identification of the record or the attribute corresponding to the attribute identification of the record, the corresponding identification may be recorded; thus, the storage of redundant data can be reduced and storage space saved.

In another embodiment, the storage and processing module is further configured for, after the acquisition module obtains the triplet information and before the storage and processing module stores the triplet information, determining whether the length of the attribute value of the specific resource is greater than a predetermined threshold value; if the length of the attribute value of the specific resource is greater than the predetermined threshold value, searching for the attribute value identification corresponding to the attribute value of the specific resource; the storage and processing module, when storing the triplet information, is specifically configured for: representing the attribute value of the specific resource by the attribute value identification.

It can be seen that, in this embodiment, when triplet information is stored, an attribute value having a length greater than a predetermined threshold is represented by the corresponding attribute value identification, instead of direct storage of its specific contents; thus, storage space can be further saved.

In another embodiment, the storage and processing module is further configured for, after searching for the attribute value identification corresponding to the attribute value of the specific resource and before storing the triplet information, if the attribute value identification corresponding to the attribute value of the specific resource is not found, creating the attribute value identification and recording the correspondence relationship between the attribute value identification and the attribute value of the specific resource.

It can be seen that, in this embodiment, whether an attribute value identification already exists is checked; if there is no corresponding attribute value identification, an identification is created and recorded. Thus, during subsequent RDF data storage, if there is an attribute value corresponding to the attribute value identification of the record, the corresponding identification may be recorded; thus, the storage of redundant data can be reduced and storage space saved.

In another embodiment, the storage and processing module is further configured for: after the receiving module receives the RDF data to be stored, determining the type of the RDF data to be stored; storing the identification information of the type corresponding to the triplet information stored.

It is thus clear that, in this embodiment, by storing the identification information about the type of RDF data, during a search, RDF data can be quickly retrieved and screened by the identification information about the type; thus, the query efficiency can be improved.

In another embodiment, the storage and processing module, when searching for the resource identification corresponding to the resource name of the specific resource and the first namespace, is specifically configured for: searching for the first namespace identification corresponding to the first namespace; searching for the resource identification corresponding to the first namespace identification and the resource name of the specific resource; and/or the storage and processing module, when searching for the attribute identification corresponding to the attribute of the specific resource and the second namespace, is specifically configured for: searching for the second namespace identification corresponding to the second namespace; searching for the attribute identification corresponding to the second namespace identification and the attribute of the specific resource.

It is thus clear that, in this embodiment, by using a namespace identification to represent a resource name and/ or the namespace used by an attribute, storage of redundant data can be reduced to further save storage space.

In another aspect, an apparatus for storing data according to an embodiment of the present invention comprises: a memory coupled to the processor for storing an executable instruction; the executable instruction, when executed in the processor, causes the processor to execute an embodiment of a method as described above.

It can be seen that, by using such a device, it is possible to reduce the storage of redundant data, thereby saving storage space.

In another embodiment, a computer-readable medium according to an embodiment of the present invention comprises a code for causing a computer to execute a method as described above.

It can be seen that, by using such a computer-readable medium, it is possible to reduce the storage of redundant data, thereby saving storage space.

RDF is a standard specification language used to describe web resource information; it is a data model. In an RDF model, Uniform Resource Identifiers (URIs) can be used to identify resources; attributes and attribute values are used to describe resources. Description of a resource is also a statement of the attributes and attribute values of the resource; therefore, it is also known as a statement. The basic structure of a statement is the "Subject-Predicate-Object" triplet, also known as the "Resource-Attribute-Attribute Value" triplet. It can be seen that the subject is the described resource; the predicate is an attribute of the resource; and the object is the attribute value corresponding to the attribute.

Then, it is understandable that there may be duplicate or redundant information between a large number of triplet information. For example, if the same resource may have multiple attributes, information such as the name of the resource may be redundant for each triplet of the resource. Another example is that multiple resources may be described using the same attribute. Thus, the specific name of the attribute may be redundant between the triplet information of multiple resources.

However, in the conventional RDF data storage technology, there is duplicate storage of such redundant information, resulting in waste of storage space.

In this regard, an embodiment of the present invention provides an improved data storage scheme. In summary, in an embodiment of the present invention, triplet information is obtained from RDF data to be stored, and the resource identification and attribute identification respectively corresponding to the resource name and attribute included in the triplet information are searched. Thus, when the triplet information is stored, the corresponding identifications are respectively used to represent resource names and attributes, rather than directly and repeatedly storing its specific contents. Therefore, the storage of redundant data can be reduced to save storage space.

Further, when the triplet information is stored, the attribute value having a length greater than a predetermined threshold is represented by a corresponding attribute value identification, rather than direct storage of its specific contents. Thus, the storage space can be further saved.

Further, the identification information about the type of the RDF data can be stored corresponding to the triplet information about the RDF data. Thus, during a search, RDF data can be quickly retrieved and screened by the identification information about the type; thus, the query efficiency can be improved.

Hereinafter, various embodiments of the present invention will be described in detail with reference to the accompanying drawings.

FIG. 1 is a schematic view of an example of the scenario in which an embodiment of the present invention can be applied. It will be appreciated that the example of FIG. 1 is to aid those skilled in the art to better understand embodiments of the present invention only, instead of limiting the scope of embodiments of the present invention.

In the example of FIG. 1, a data storage system 110 and a data acquisition device 120 are shown, wherein the storage system 110 may include centralized, distributed, and cloud storage systems.

The storage system 110 and the data acquisition device 120 may communicate with each other in a wired or wireless manner. For example, the data acquisition device 120 may obtain RDF data to be stored and send the obtained RDF data to the storage system 110. After the storage system 110 receives the RDF data, it can store the RDF data.

The storage system 110 and the data acquisition device 120 can also be implemented in the same apparatus, the same apparatus having the data acquisition function and the data storage function.

It is conceivable that the example shown in FIG. 1 may be applied in various fields. For example, the example shown in FIG. 1 may belong to the field of transportation. The data acquisition device 120 can acquire traffic data at road junctions. For example, the data acquisition device 120 may be implemented by devices including sensors and cameras. The traffic data collected can be represented by an RDF model. Subsequently, the data acquisition device 120 may send the RDF data, which describes the traffic condition, to the storage system 110 so that the storage system 110 stores such data.

The storage system 120 can store RDF data by employing a plurality of types of databases, such as relational databases. For example, FIG. 1 shows a storage system 120 comprising a relational database 130. The relational database 130 may be implemented using an existing relational database, for example, Sqlserver, Oracle, and MySQL.

Methods of storing RDF based on a relational database can generally adopt a variety of models: based on horizontal tables, vertical tables, attribute tables, mixed mode, etc. However, due to the explosive growth of RDF data, users wish to store huge amounts of data efficiently while saving storage space as much as possible. The above-mentioned storage modes can hardly meet such needs. As described above, in the triplet information contained in RDF data, there may be a lot of redundant information. The storage of such redundant information will result in a waste of storage space. In these storage models based on relational databases, this problem has not been effectively solved.

In this regard, embodiments of the present invention provide an effective solution. The solution of embodiments of the present invention will be described in detail below with reference to specific examples.

Figure 2:
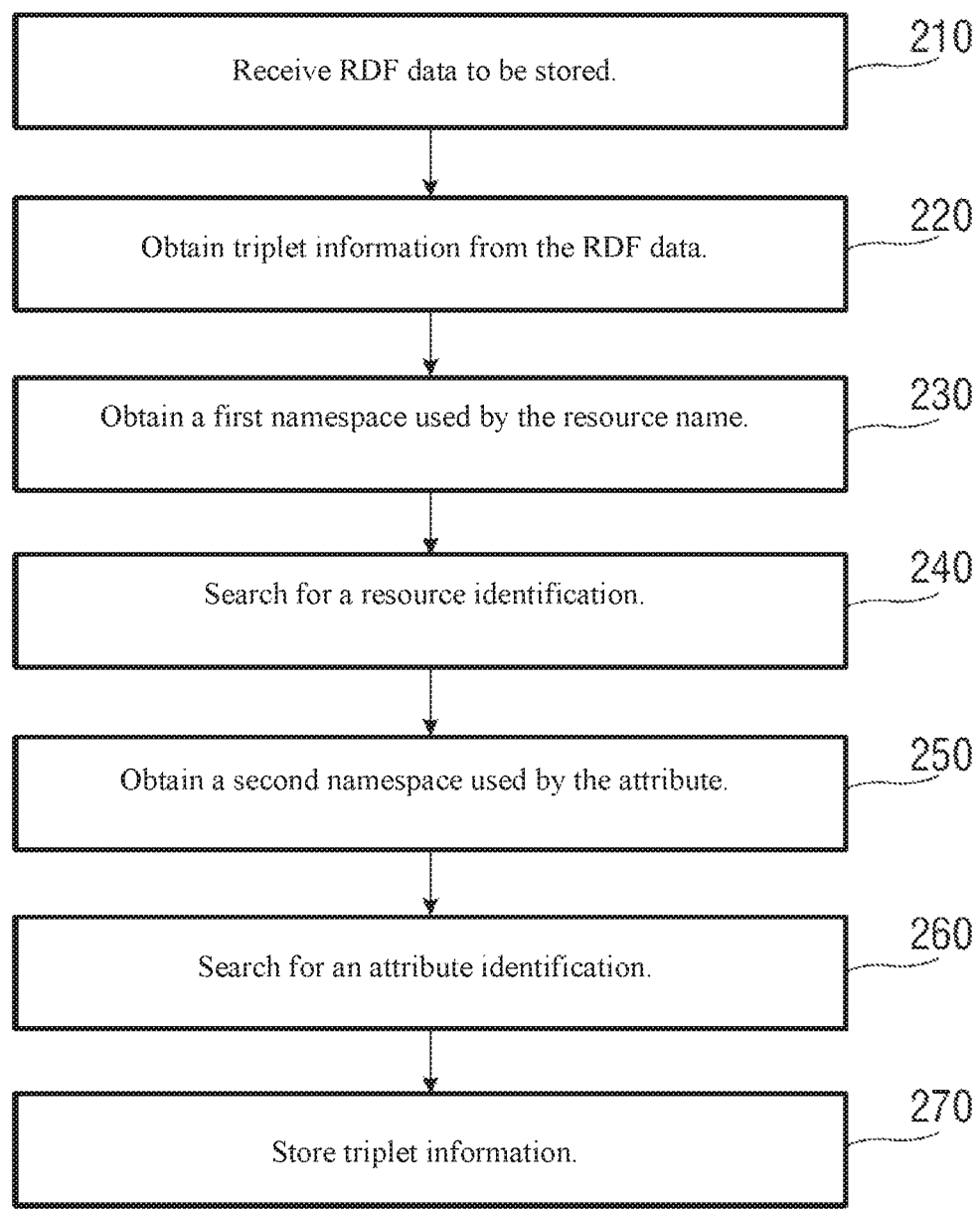
FIG. 2 is a flowchart of a method for storing data according to an embodiment of the present invention.

FIG. 2 is a flowchart of a method for storing data according to an embodiment of the present invention. For example, the method of FIG. 2 may be performed by the storage system 110 shown in FIG. 1.

As shown in FIG. 2, in step 210, the RDF data to be stored is received.

In step 220, triplet information is obtained from the RDF data, wherein the triplet information comprises three pieces of information: the resource name of a specific resource, the attribute of a specific resource, and the attribute value of a specific resource represented by the RDF data.

In step 230, a first namespace used by the resource name of a specific resource is obtained from the RDF data to be stored.

In step 240, the resource identification corresponding to the resource name of the specific resource and the first namespace is searched.

In step 250, a second namespace used by an attribute of the specific resource is obtained from the RDF data to be stored.

In step 260, an attribute identification corresponding to the attribute of a specific resource and the second namespace is searched.

In step 270, the triplet information is stored, wherein the resource name of the specific resource is represented by the resource identification, and the attribute of the specific resource is represented by the attribute identification.

Wherein, the search for a resource identification and attribute identification may not be limited to a sequence. For example, as shown in FIG. 2, steps 230 and step 240 can be performed before steps 250 and 260; another example is as follows: steps 250 and 260 may be performed before steps 230 and 240; yet another example is as follows: steps 250 and 260 can be performed simultaneously with steps 230 and 240.

It is thus clear that, in an embodiment of the present invention, by searching for the resource identification and attribute identification respectively corresponding to a resource name and attribute, and by representing resource names and attributes respectively with the corresponding identifications when storing triplet information, the storage of redundant data can be reduced to save storage space.

The technical solution of embodiments of the present invention will be further described below with reference to specific examples.

Figure 3A:
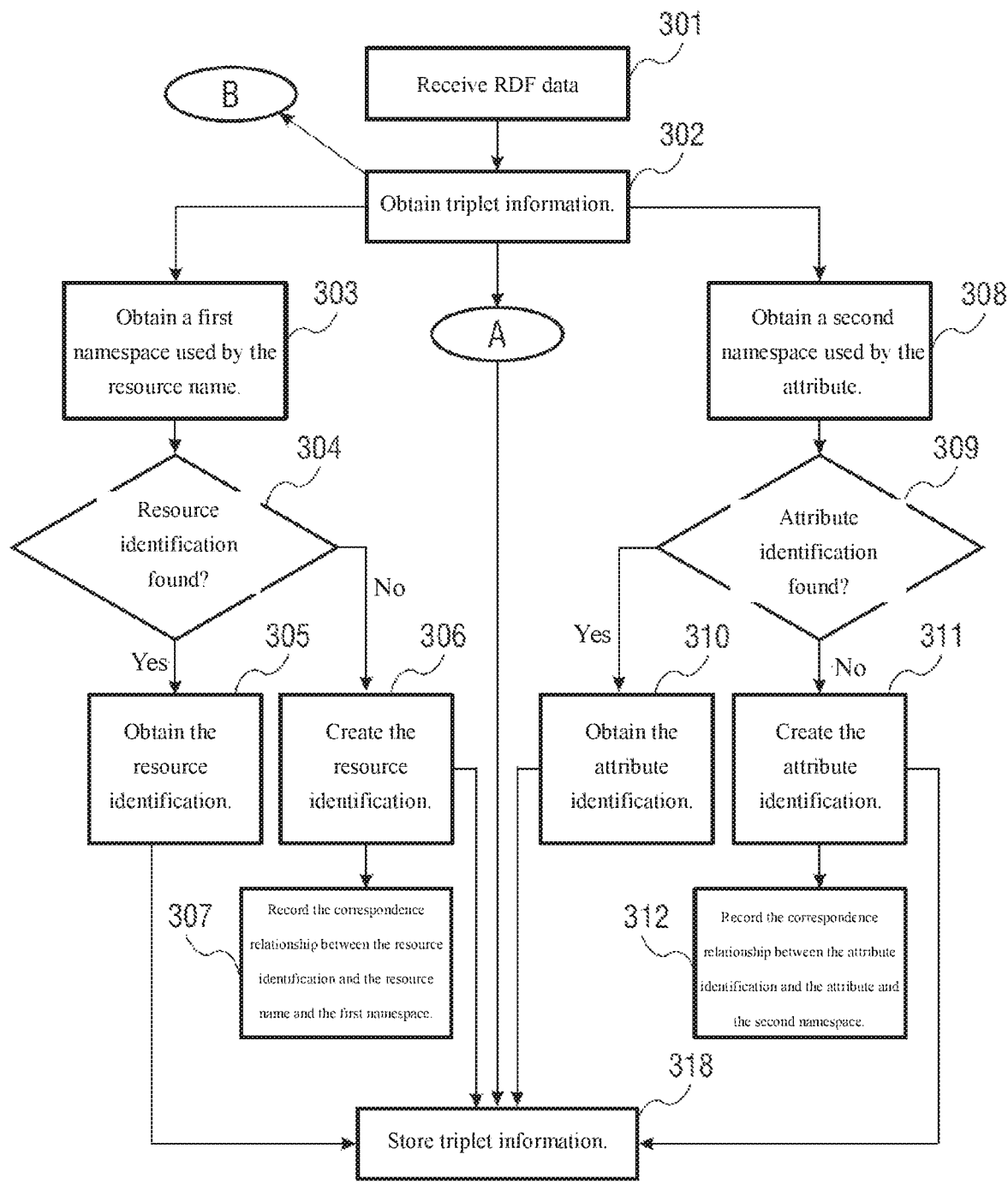
FIG. 3A to FIG. 3C show a flowchart of a method for storing data according to an embodiment of the present invention.
Figure 3B:
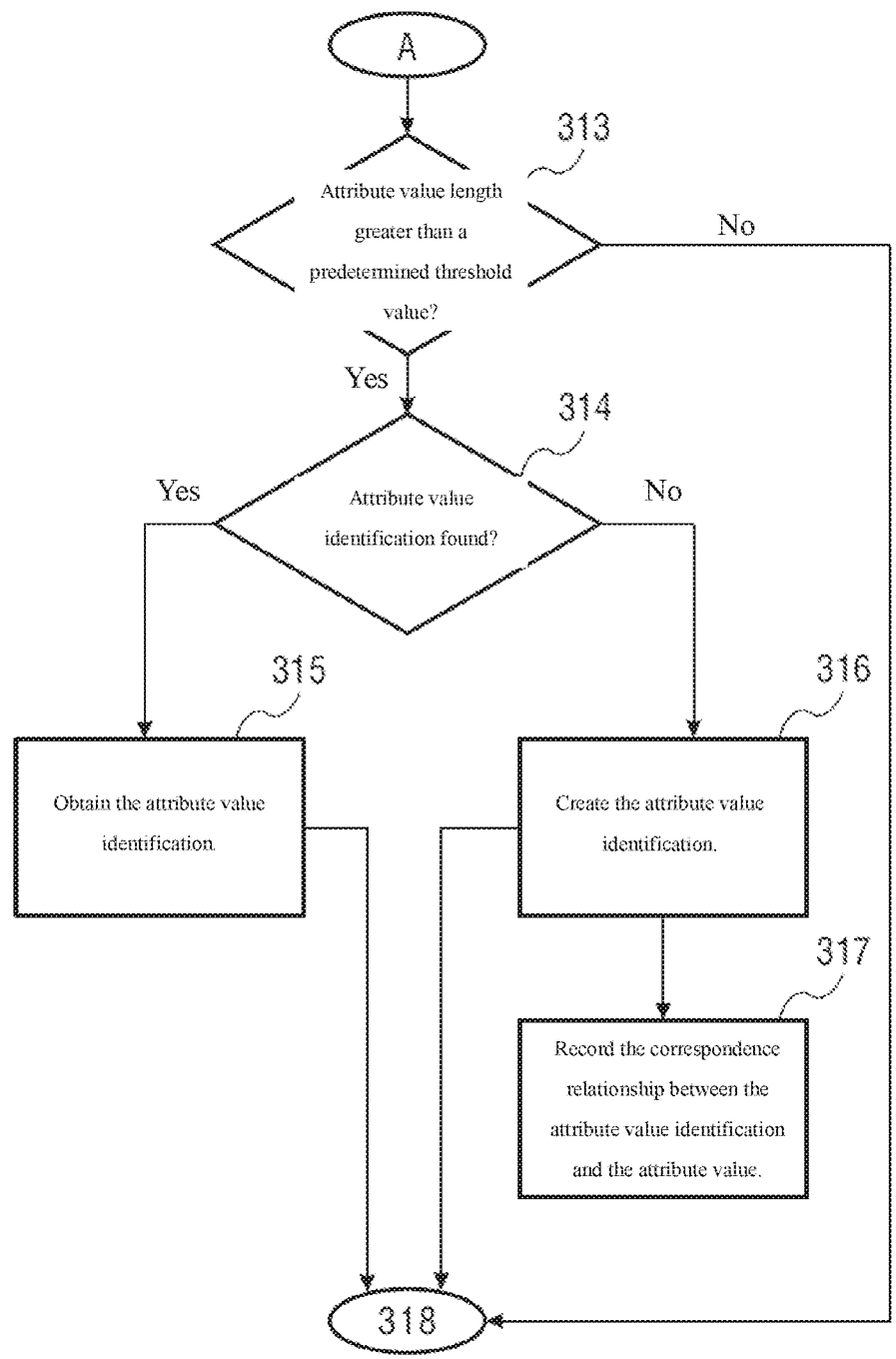
Figure 3C:
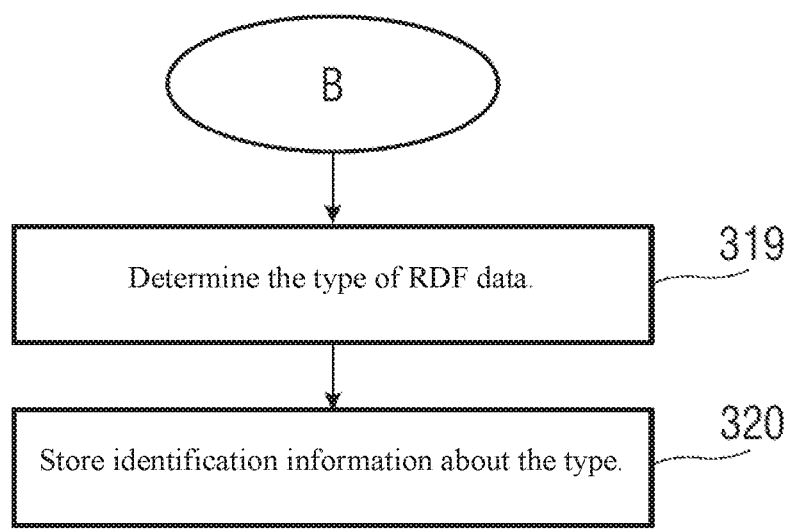

FIGS. 3A, 3B, and 3C collectively show a flowchart of a method for storing data according to an embodiment of the present invention. For example, the flow shown in FIGS. 3A, 3B, 3C may be performed by the storage system 110 shown in FIG. 1.

As shown in FIG. 3A, in step 301, RDF data to be stored is received.

For example, with the example of FIG. 1, the storage system 110 may receive RDF data from the data acquisition device 120.

In step 302, triplet information is obtained from the received RDF data.

The RDF data may be used to describe a specific resource. Then, the obtained triplet information may contain the resource name of a specific resource, the attribute of a specific resource, and the attribute value of a specific resource.

In order to avoid storing the redundant data that may exist in the triplet information, some processing needs to be performed on the resource name and attribute for a specific resource before the triplet information is stored. Specifically, it is possible to determine the respective identities of the resource names and attributes of the specific resource. Thus, when the two pieces of information are stored, they can be represented by identifications without having to store their specific contents.

Steps 303 to 307 describe the procedure of processing the resource name of a specific resource; steps 308 to 312 describe the procedure of processing the attribute of a specific resource.

Regarding the procedure of processing the resource name of a specific resource:

In step 303, a first namespace used by the resource name of the specific resource is obtained from RDF data.

In step 304, any resource identification corresponding to the resource name of the specific resource and the first namespace is searched.

If the resource identification exists, then the flow proceeds to step 305. If the resource identification does not exist, then the flow proceeds to step 306.

In step 305, if the resource identification is found, the resource identification is obtained.

In step 306, if the resource identification is not found, the resource identification corresponding to the resource name of the specific resource and the first namespace is created.

In step 307, the correspondence relationship between the created resource identification and the resource name of the specific resource and the first namespace is recorded.

Regarding the procedure of processing the attributes of a specific resource:

In step 308, a second namespace used by an attribute of the specific resource is obtained from the RDF data to be stored.

In step 309, any attribute identification corresponding to the attribute of the specific resource and the second namespace is searched.

If the attribute identification exists, then the procedure proceeds to step 310. If the identification attribute is not present, then the process goes to step 311.

In step 310, if the attribute identification is found, the attribute identification is obtained.

In step 311, if the attribute identification is not found, the attribute identification corresponding to the attribute of the specific resource and the second namespace is created.

In step 312, the correspondence relationship between the created attribute identification and the attribute of the specific resource and the second namespace is recorded.

As shown in FIG. 3A, after steps 305, 306, 310 and 311, the flow proceeds to step 318.

In step 318, the triplet information is stored.

In previous steps, the resource identification and attribute identification of the specific resource are identified. Therefore, in this step, when the two pieces of information are stored, they can be represented using the corresponding identifications. It is thus clear that, since the specific contents of the resource name and attribute are not stored repeatedly, storage of redundant data can be reduced to save storage space.

Further, in order to further save storage space, the above-mentioned namespace can also be represented by the corresponding namespace identification.

Then, in step 304, the specific process may be as follows: a first namespace identification corresponding to the first namespace can be searched first; then, the resource identification corresponding to the first namespace identification and resource name can be searched.

If the first namespace identification is not found, a namespace identification corresponding to the first namespace can also be created, and the correspondence relationship between the first namespace and the first namespace identification can be recorded.

Similarly, in step 309, the specific process may be as follows: first searching for the second namespace identification corresponding to the second namespace, and then searching for the attribute identification corresponding to the second namespace identification and attribute.

If the second namespace identification is not found, a namespace identification corresponding to the second namespace can also be created, and the correspondence relationship between the second namespace and the second namespace identification can be recorded.

It will be appreciated that a first namespace and a second namespace may be the same or may be different.

Further, as an attribute value may be a long string, if a string length is stored repeatedly, more storage space will be wasted. Therefore, in order to further save storage space, appropriate processing can be performed on the attribute value of the specific resource. Circle A in FIG. 3A shows that, after step 302, the processing corresponding to circle A, that is, processing on the attribute value the specific resource, can also be performed. The process is shown in FIG. 3B. That is, in FIG. 3B, steps 313 to 317 describe a procedure of processing attribute values of a specific resource.

As shown in FIG. 3B, the processing procedure regarding the attribute values of a specific resource is as follows:

In step 313, whether the length of the attribute value of the specific resource is greater than a predetermined threshold value is determined.

If the attribute value is greater than the predetermined threshold value, the flow proceeds to step 314.

In step 314, any attribute value identification corresponding to the attribute value of the specific resource is searched.

If the attribute value identification exists, the flow proceeds to step 315. If the attribute value identification does not exist, the flow proceeds to step 316.

In step 315, the attribute value identification found is obtained.

In step 316, because no attribute value identification is found, an attribute value identification corresponding to the attribute value of the specific resource is created.

In step 317, the correspondence relationship between the created attribute value identification and the attribute value of the specific resource is recorded.

As shown in FIG. 3B, after step 315 or step 316, the flow proceeds to step 318.

In this case, in step 318, the length of the attribute value of the specific resource is greater than the predetermined threshold value; therefore, when the triplet information is stored, the attribute value is represented by the attribute value identification obtained in step 315 or the attribute value identification created in step 316.

The flow returns again to step 313. If it is determined that the attribute value is not greater than the predetermined threshold value, the flow proceeds to step 318. In this case, in step 318, the length of the attribute value of the specific resource is not greater than the predetermined threshold value; therefore, when the triplet information is stored, the attribute value is directly stored, instead of being represented by an attribute value identification.

As can be seen from this process, when the attribute value of a long string is stored, it is represented by its attribute value identification, rather than direct storage of its specific details; thus, storage space can be further saved.

Further, for storing an attribute value, there may also be another alternative implementation mode, that is, the operation of determining whether the length of the attribute value is greater than the predetermined threshold value is not performed. In the case where the corresponding attribute value identification is found with an attribute value, if no corresponding attribute value identification is found, alternatively, the attribute value identification is created and the correspondence relationship between the created data value identification and the attribute value is recorded.

In this alternative implementation mode, without considering the length of an attribute value, the step of determining the length of an attribute value is omitted; in most cases where the length of the attribute value is large, the processing load of the storage system 110 can be reduced.

Further, as shown in FIG. 3A, after step 302, the process corresponding to circle B can be further executed. FIG. 3C shows the process after proceeding to circle B.

As shown in FIG. 3C, in step 319, the type of the RDF data is determined.

For example, the type of RDF data may refer to the source of the RDF data. For example, in the field of transport, the type may indicate the road junction and road which the RDF data is from, or the type can indicate whether the RDF data is sunny day data or rainy day data. Specific categorization methods may be pre-defined according to the actual application environment.

In step 320, corresponding to the stored the triplet information, the identification information of this type is stored.

In this case, the identification information of the type may be predefined.

It is thus clear that, in this embodiment, by storing the identification information about the type of RDF data, the type of the RDF data is stored during storage; at the time of data retrieval and screening, RDF data of the corresponding type can be quickly retrieved and screened by the identification information about the type; thus, the query efficiency can be improved. For example, in the field of transport, assume that the above-mentioned type is used to indicate the source of RDF data; then, based on the pre-defined identification information corresponding to junction a of road A, it is possible to quickly query the RDF data on the road junction.

In an embodiment, the types of each identification (ID) mentioned above may be integers. In other embodiments, the types of these identifications may be string. Compared with the integer type, the string type requires a smaller storage space and is easy to retrieve and order. Compared with the integer type, the string type is self-explanatory and thus can be understood more easily. Thus, the type of the above-mentioned identifications may be selected according to the actual demands, which is not limited in embodiments of the present invention.

In another embodiment, the triplet information and all the above-mentioned correspondence relationships can be stored in a relational database.

Further, the RDF data received in step 301 may be in the form of a single piece of RDF data or in the form of an RDF file containing a plurality of pieces of RDF data. For example, in connection with the example shown in FIG. 1, the data acquisition device 120 can, after obtaining a piece of RDF data, send this piece of RDF data to the storage system 110 for storage. Alternatively, the data acquisition device 120 may, after obtaining a plurality of pieces of RDF data, form them into an RDF file and then send the RDF file to the storage system 110 for storage. This is not limited by embodiments of the present invention.

It should be understood that the process numbers in the above-described FIGS. 3A to 3C do not imply an execution sequence; the execution sequence of the processes should be determined by its function and internal logic, without constituting any limitation of the implementation procedure of an embodiment of the present invention. For example, steps 303 to 307, steps 308 to 312, and steps 313 to 317 can be executed concurrently.

Further, in order to help those skilled in the art to better understand embodiments of the present invention, the following describes a storage solution according to an embodiment of the present invention using relational databases as an example, but embodiments of the present invention are not limited thereto.

Figure 4:
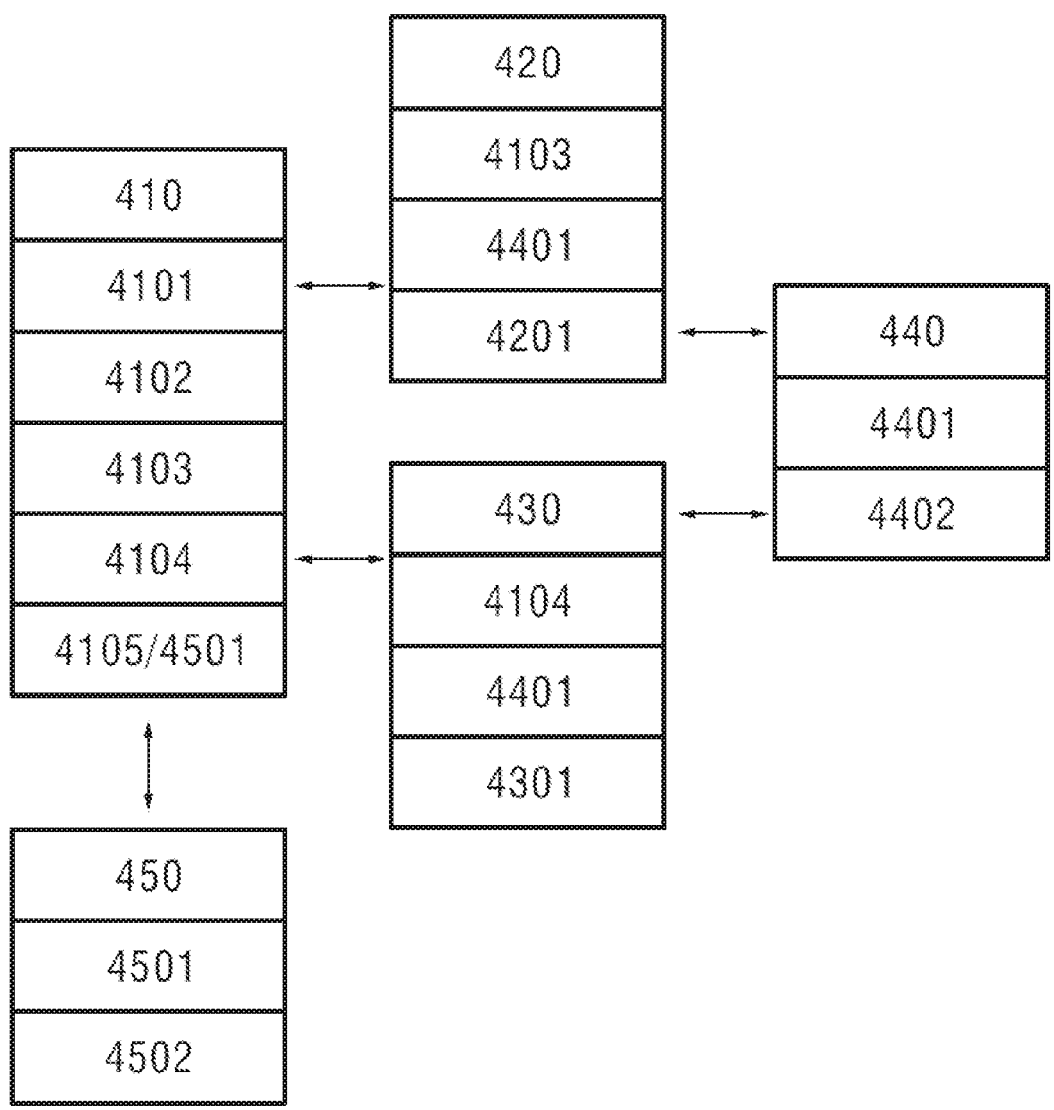
FIG. 4 shows the fields contained in various database tables in embodiments of the present invention and the correlation between the tables.

FIG. 4 shows an example of a database table according to an embodiment of the present invention. As shown in FIG. 4, in a relational database (for example, the relational database 130 shown in FIG. 1), a Resource Description Table 410, a Namespace Table 420, an Attribute Table 430, a Resource Table 440, and a Long String Attribute Value Table 450 can be created. The Resource Description Table 410 may be a master table, while the Namespace Table 420, the Attribute Table 430, the Resource Table 440, and the Long String Attribute Value Table 450 may be auxiliary tables.

As shown in FIG. 4, the Resource Description Table 410 may contain the following fields: Statement_ID 4101, Model_ID 4102, Resource_ID 4103, Attribute_ID 4104, and Attribute Value 4105/Attribute Value_ID 4501. Among them, Statement_ID refers to a statement identification; it is the identification corresponding to each piece of triplet information. Model_ID 4102 may refer to an identification of the type of RDF data; Resource_ID 4103 and Attribute_ID 4104 respectively refer to the resource identification and attribute identification.

The Resource Table 420 may contain the following fields: Resource_ID 4103, Namespace_ID 4401, and Resource Name 4201, wherein, Namespace_ID 4401 represents a namespace identification.

The Attribute Table 430 may contain the following fields: Attribute_ID 4104, Namespace_ID 4401, and Attribute 4301.

The Namespace Table 440 may contain the following fields: Namespace_ID 4401 and Namespace 4402.

The Long String Attribute Value Table 450 can contain the following fields: Attribute Value_ID 4501 and Attribute Value 4502.

As described above, if the length of the attribute value is greater than a predetermined threshold value, the bottommost field in the Resource Description Table 410 is Attribute Value_ID 4501. If the length of the attribute value is not greater than a predetermined threshold value, the field is Attribute Value 4105.

As shown in FIG. 4, the tables can be correlated by the corresponding identifications, and thus subsequent queries can be performed effectively.

Using Table 1 to Table 5, the following describes the data types that correspond to the fields in each of the tables above. Table 1 shows the data types corresponding to the fields in the Resource Description Table; Table 2 shows the data types corresponding to the fields in the Resource Table; Table 3 shows the data types corresponding to the fields in the Attribute Table; Table 4 shows the data types corresponding to the fields in the Namespace Table; and Table 5 shows the data types corresponding to the fields in the Long string attribute value Table.

As shown in Table 1 to Table 5, the data type corresponding to the statement identification, resource identification, attribute identification, and attribute value identification may be the big integer (BIGINT) type; the data type corresponding to the identification information of the type (that is, Model_ID) and namespace identification can be the integer (INT) type.

TABLE 1

Resource Description Table

| Column name | Data type |
| --- | --- |
| Statement_ID | BIGINT |
| Model_ID | INT |
| Resource_ID | BIGINT |
| Attribute_ID | BIGINT |
| Attribute Value | Any type |

TABLE 2

Resource Table

| Column name | Data type |
| --- | --- |
| Resource_ID | BIGINT |
| Namespace_ID | INT |
| Resource Name | VARCHAR |

TABLE 3

Attribute Table

| Column name | Data type |
| --- | --- |
| Attribute_ID | BIGINT |
| Namespace_ID | INT |
| Attribute | VARCHAR |

TABLE 4

Namespace Table

| Column name | Data type |
|---|---|
| Namespace_ID | INT |
| Namespace | VARCHAR |

TABLE 5

Long String Attribute Value Table

| Column name | Data type |
|---|---|
| Attribute Value_ID | BIGINT |
| Attribute Value | LONG VARCHAR |

To further help those skilled in the art to understand embodiments of the present invention, the following specific examples are given. It should be understood that the following examples are only intended to help those skilled in the art to better understand embodiments of the present invention, instead of limiting embodiments of the present invention.

Assume that the RDF data to be stored are described as follows:

```
<rdf:RDF
xmlns:rdf= "http://www.w3.org/1999/02/22-rdf-syntax-ns#"
xmlns:rdf= "http://www.recshop.fake/cd#">
<rdf:Description rdf:about= "http://www.recshop.fake/cd/Empire
Burlesque">
      <cd:artist>Bob Dylan</cd:artist>
      < cd:country>USA</cd:country>
      < cd:year>1985</cd:year>
      <cd:web>http://www.recshop.fake/shops/books/USA/Empire
Burlesque</cd:web>
</rdf:Description>
<rdf:Description    rdf:about=    "http://www.recshop.fake/cd/Hide
your heart">
      <cd:artist>Bonnie Tyler</cd:artist>
      < cd:country>UK</cd:country>
      < cd:year>1988</cd:year>
      <     cd:web>http://www.recshop.fake/shops/books/USA/Hide
your heart</cd:web>
</rdf:Description>
</rdf:RDF>
```

It is clear that the example RDF data describes two resources, each having four attributes. Assume that the two resources are of the same type and that the Model_ID corresponding to the type is 200001; assume that the two resources respectively correspond to resource identifications 300001 and 300002; assume that the four attributes (that is, artist, country, year, and web) respectively correspond to attribute identifications 400001, 400002, 400003 and 400004. Assume that the attribute values of the attribute web of the two resources are long strings and each have the corresponding value identifications 500001 and 500002. Further, assume that the identifications of each statement are 100001 to 100008 respectively. Further, the example RDF data shows that the namespace used by the resource and the namespace used by the attribute are the same; assume that the corresponding namespace identification is 600002. Further, assume that the identification of another namespace recorded in the RDF data is 600001.

Then, the example RDF data is stored using the Resource Description Table, the Namespace Table, the Resource Table, the Attribute Table, and the Long String Attribute Value Table provided in FIG. 4. Table 6 to Table 10 show the specific contents of each table.

TABLE 6

Resource Description Table

| Statement_ID | Model_ID | Resource_ID | Attribute_ID | Attribute Value |
|---|---|---|---|---|
| 100001 | 200001 | 300001 | 400001 | Bob Dylan |
| 100002 | 200001 | 300001 | 400002 | USA |
| 100003 | 200001 | 300001 | 400003 | 1985 |
| 100004 | 200001 | 300001 | 400004 | 500001 |
| 100005 | 200001 | 300002 | 400001 | Bonnie Tyler |
| 100006 | 200001 | 300002 | 400002 | UK |
| 100007 | 200001 | 300002 | 400003 | 1988 |
| 100008 | 200001 | 300002 | 400004 | 500002 |

TABLE 7

Namespace Table

| Namespace_ID | Namespace |
|---|---|
| 600001 | http://www.w3.org/1999/02/22-rdf-syntax-ns# |
| 600002 | http://www.recshop.fake/cd# |

TABLE 8

Resource Table

| Resource_ID | Namespace_ID | Resource Name |
|---|---|---|
| 300001 | 600002 | Empire Burlesque |
| 300002 | 600002 | Hide your heart |

TABLE 9

Attribute Table

| Attribute_ID | Namespace_ID | Attribute |
|---|---|---|
| 400001 | 600002 | artist |
| 400002 | 600002 | country |
| 400003 | 600002 | year |
| 400004 | 600002 | web |

TABLE 10

Long String Attribute Value Table

| Attribute Value_ID | Attribute Value |
|---|---|
| 500001 | http://www.recshop.fake/shops/books/USA/Empire Burlesque |
| 500002 | http://www.recshop.fake/shops/books/USA/Hide your heart |

It is thus clear that this storage method can greatly reduce the storage of redundant data, thereby saving storage space.

With the storage solution provided in an embodiment of the present invention, an experiment was performed on 5,368,220 RDF data records. The 5,368,220 RDF data records were converted into triplet information, a total of 21,472,880 pieces of triplet information. If the triplet information is stored directly in a relational database, the required storage space is 475.5 M, and the average query response time is 2,785 ms. In contrast, when the storage solution provided by an embodiment of the present invention was used for the storage, there were 21,472,880 records in the Resource Description Table, only 7 records in the Namespace Table, 5,368,220 records in the Resource Table, 4 records in the Attribute Table, and 9,256 records in the Long String Attribute Value Table. These five tables occupied a storage space of 314.3 M, and the average query response time was 3,152 ms.

It is thus clear that, compared with direct storage of triplet information, with the storage solution provided in an embodiment of the present invention, the storage space was reduced by 33.9%, and the average query response time increased by 13.2%. Obviously, using the storage solution provided in an embodiment of the present invention can greatly save storage space.

Figure 5:
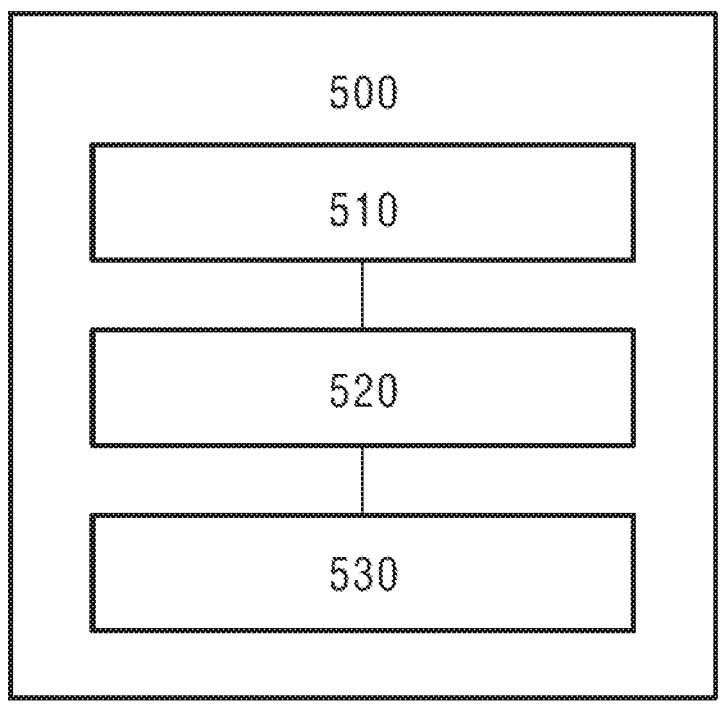
FIG. 5 is a schematic view of an apparatus for storing data according to an embodiment of the present invention.

See FIG. 5, which shows a schematic view of an apparatus for storing data according to an embodiment of the present invention. The apparatus 500 shown in FIG. 5 may be implemented using software, hardware (for example, an integrated circuit or a DSP), or a combination of hardware and software. For example, the apparatus 500 may be located in the storage system 110 shown in FIG. 1.

As shown in FIG. 5, the apparatus 500 may comprise a receiving module 510, an acquisition module 520, and a storage and processing module 530.

The receiving module 510 receives RDF data to be stored. In conjunction with the example shown in FIG. 1, the receiving module 510 may obtain the RDF data to be stored from the data acquisition device 120. For example, the example shown in FIG. 1 may belong to the field of transport. Then, the receiving module 510 may obtain traffic condition data on a road junction from the data acquisition device 120, and the data acquisition device 120 may be implemented by devices such as sensors and cameras.

The acquisition module 520 obtains triplet information from the RDF data to be stored, wherein the triplet information comprises three pieces of information: the resource name of a specific resource, the attribute of a specific resource, and the attribute value of a specific resource represented by the RDF data. The storage and processing module 530 is configured for: obtaining from the RDF data to be stored a first namespace used by the resource name of the specific resource; searching for a resource identification corresponding to a resource name and first namespace of the specific resource; obtaining from the RDF data to be stored a second namespace used by an attribute of the specific resource; searching for an attribute identification corresponding to the attribute of a specific resource and the second namespace; storing triplet information, wherein the resource name of a specific resource is represented by a resource identification, and the attribute of the specific resource is represented by an attribute identification.

It is thus clear that, by searching for the resource identification and attribute identification respectively corresponding to a resource name and attribute, and by representing resource names and attributes respectively with the corresponding identifications when storing triplet information, the storage of redundant data can be reduced and thus storage space saved.

In an embodiment, the storage and processing module 530 is further configured for: after searching for a resource identification corresponding to the resource name of the specific resource and the first namespace and before storing the triplet information, if the resource identification corresponding to the resource name of the specific resource and the first namespace is not found, creating the resource identification and recording the correspondence relationship between the resource identification and the resource name of the specific resource and the first namespace; and/or, if the attribute identification corresponding to the attribute of the specific resource and the second namespace is not found, creating the attribute identification and recording the correspondence relationship between the attribute identification and the attribute of the specific resource and the second namespace.

In another embodiment, the storage and processing module 530 is further configured for: after the acquisition module 520 obtains the triplet information and before the storage and processing module 530 stores the triplet information, determining whether the length of the attribute value of the specific resource is greater than a predetermined threshold value; if the length of the attribute value of the specific resource is greater than the predetermined threshold value, searching for the attribute value identification corresponding to the attribute value of the specific resource.

The storage and processing module 530, when storing triplet information, is specifically configured for: representing the attribute value of a specific resource by an attribute value identification.

In another embodiment, the storage and processing module 530 is further configured for: after searching for the attribute value identification corresponding to the attribute value of the specific resource and before storing triplet information, if the attribute value identification corresponding to the attribute value of the specific resource is not found, creating the attribute value identification and recording the correspondence relationship between the attribute value identification and the attribute value of the specific resource.

In another embodiment, the storage and processing module 530 is further configured for: after the receiving module 510 receives the RDF data to be stored, determining the type of the RDF data to be stored; storing the identification information of the type corresponding to the triplet information stored.

In another embodiment, the storage and processing module 530, when searching for the resource identification corresponding to the resource name of a specific resource and a first namespace, is specifically configured for: searching for the first namespace identification corresponding to the first namespace; searching a resource identification corresponding to the first namespace identifier and the resource name of the specific resource; and/or the storage and processing module 530, when searching for the attribute identification corresponding to the attribute of a specific resource and a second namespace, is specifically configured for: searching for the second namespace identification corresponding to the second namespace; searching for an attribute identification corresponding to the attribute of a specific resource and the second namespace.

Figure 6:
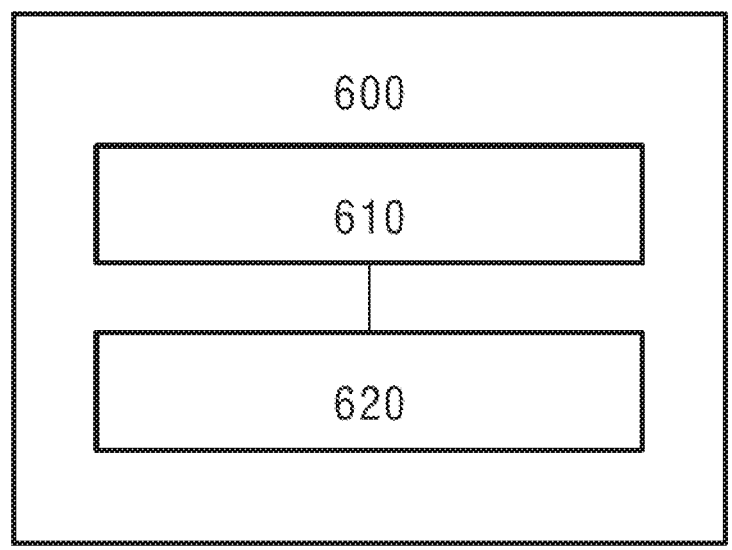
FIG. 6 is a schematic view of an apparatus for storing data according to an embodiment of the present invention.

See FIG. 6, which is a schematic view of an apparatus for storing data according to an embodiment of the present invention. As shown in FIG. 6, the apparatus 600 may comprise a processor 610 and a memory 620. The memory 620 may store an executable instruction; the executable instruction, when executed in the processor 610, causes the processor 610 to perform the flow shown in FIG. 2 and FIGS. 3A to 3C.

It should be understood that, in an embodiment of the present invention, RDF data can be stored in the memory 620; alternatively, RDF data can be stored in a storage device different from the memory 620. This is not limited by an embodiment of the present invention.

An embodiment of the present invention further provides a computer-readable medium. The computer-readable medium may comprise a code that causes a computer to perform the process shown in FIG. 2 and FIGS. 3A to 3C.

While the present invention has been particularly described above with reference to the drawings and a preferred embodiment, it should be understood the embodiment is not intended to limit the present invention and that any other solution derived therefrom by those of ordinary skill in the art falls within the scope of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for storing data, comprising:
   receiving Resource Description Framework (RDF) data to be stored;
   obtaining triplet information from the RDF data to be stored, the triplet information including at least a resource name of a resource, an attribute of the resource, and an attribute value of the resource represented by the RDF data to be stored;
   obtaining, from the RDF data to be stored, a first namespace usable by the resource name of the resource;
   searching for a resource identification corresponding to the resource name of the resource and the first namespace;
   obtaining, from the RDF data to be stored, a second namespace usable by the attribute of the resource;
   searching for an attribute identification corresponding to the attribute of the resource and the second namespace;
   determining whether a length of the attribute value of the resource is greater than a threshold value;
   searching for an attribute value identification corresponding to the attribute value of the resource in response to determining that the length of the attribute value of the resource is greater than the threshold value; and
   storing the triplet information, wherein
      the resource name of the resource is represented by the resource identification,
      the attribute of the resource is represented by the attribute identification,
      the attribute value of the resource is represented by the attribute value identification in case the length of the attribute value of the resource is greater than the threshold value, and
      the attribute value is directly stored in case the length of the attribute value of the resource is less than or equal to the threshold value.

2. The method of claim 1, wherein the method further comprises at least one of
   first creating, in response to the resource identification corresponding to the resource name of the resource and the first namespace not being found, the resource identification and first recording a correspondence relationship between the resource identification and the resource name of the resource and the first namespace, the first creating and the first recording performed after searching for the resource identification corresponding to the resource name of the resource and the first namespace, and before storing the triplet information; or
   second creating, in response to the attribute identification corresponding to the attribute of the resource and the second namespace not being found, the attribute identification and second recording a correspondence relationship between the attribute identification and the attribute of the resource and the second namespace, the second creating and the second recording performed after searching for the attribute identification corresponding to the attribute of the resource and the second namespace, and before storing the triplet information.

3. The method of claim 2, wherein, after receiving the RDF data to be stored, the method further comprises:
   determining a type of the RDF data to be stored; and
   storing identification information of the type corresponding to the triplet information.

4. The method of claim 2, wherein at least one of:
   the searching for a resource identification corresponding to the resource name of the resource and the first namespace includes searching for a first namespace identification corresponding to the first namespace, and searching for a resource identification corresponding to the first namespace identification and the resource name of the resource; or
   the searching for the attribute identification corresponding to the attribute of the resource and the second namespace includes searching for a second namespace identification corresponding to the second namespace, and searching for an attribute identification corresponding to the second namespace identification and the attribute of the resource.

5. The method of claim 1, wherein, after searching for the attribute value identification corresponding to the attribute value of the resource and before storing the triplet information, the method further comprises:
   creating, in response to the attribute value identification corresponding to the attribute value of the resource not being found, the attribute value identification and recording a correspondence relationship between the attribute value identification and the attribute value of the resource.

6. The method of claim 1, wherein, after receiving the RDF data to be stored, the method further comprises:
determining a type of the RDF data to be stored; and
storing identification information of the type corresponding to the triplet information.

7. The method of claim 6, wherein, after searching for the attribute value identification corresponding to the attribute value of the resource and before storing the triplet information, the method further comprises:
creating, in response to the attribute value identification corresponding to the attribute value of the resource not being found, the attribute value identification and recording a correspondence relationship between the attribute value identification and the attribute value of the resource.

8. The method of claim 1, wherein at least one of:
the searching for a resource identification corresponding to the resource name of the resource and the first namespace includes: searching for a first namespace identification corresponding to the first namespace, and searching for a resource identification corresponding to the first namespace identification and the resource name of the resource; or
the searching for the attribute identification corresponding to the attribute of the resource and the second namespace includes searching for a second namespace identification corresponding to the second namespace and searching for an attribute identification corresponding to the second namespace identification and the attribute of the resource.

9. A non-transitory computer-readable medium comprising a code for causing a computer to execute the method of claim 1.

10. An apparatus for storing data, the apparatus comprising:
a receiving module to receive Resource Description Framework data to be stored;
an acquisition module to obtain triplet information from the RDF data to be stored, the triplet information including at least a resource name of a resource, an attribute of the resource, and an attribute value of the resource represented by the RDF data to be stored; and
a storage and processing module to
obtain from the RDF data to be stored, a first namespace usable by the resource name of the resource;
search for a resource identification corresponding to the resource name of the resource and the first namespace,
obtain, from the RDF data to be stored, a second namespace usable by the attribute of the resource,
search for an attribute identification corresponding to the attribute of the resource and the second namesspace,
determine whether a length of the attribute value of the resource is greater than a threshold value,
search for an attribute value identification corresponding to the attribute value of the resource in response to determining that the length of the attribute value of the resource is greater than the threshold value, and
store the triplet information, wherein
the resource name of the resource is represented by a resource identification,
the attribute of the resource is represented by the attribute identification,
the attribute value of the resource is represented by the attribute value identification in case the length of the attribute value of the resource is greater than the threshold value, and
the attribute value is directly stored in case the length of the attribute value of the resource is less than or equal to the threshold value.

11. The apparatus of claim 10, wherein the storage and processing module is configured to, after searching for the resource identification corresponding to the resource name of the resource and the first namespace and before storing the triplet information, at least one of:
create, in response to the resource identification corresponding to the resource name of the resource and the first namespace not found, the resource identification and record a correspondence relationship between the resource identification and the resource name of the resource and the first namespace; or
create, in response to the attribute identification corresponding to the attribute of the resource and the second namespace not being found, the attribute identification and record a correspondence relationship between the attribute identification and the attribute of the resource and the second namespace.

12. The apparatus of claim 11, wherein the storage and processing module is configured to, after the receiving module receives the RDF data to be stored,
determine a type of the RDF data to be stored, and
store identification information of the type corresponding to the triplet information.

13. The apparatus of claim 11, wherein the storage and processing module is further configured to at least one of
search for the resource identification corresponding to the resource name of the resource and the first namespace by searching for a first namespace identification corresponding to the first namespace, and searching for a resource identification corresponding to the resource name of the resource and the first namespace identification; or
search for the attribute identification corresponding to the attribute of the resource and the second namespace by searching for a second namespace identification corresponding to the second namespace, and searching for an attribute identification corresponding to the second namespace identification and the attribute of the resource.

14. The apparatus of claim 10, wherein the storage and processing module is configured to, after searching for the attribute value identification corresponding to the attribute value of the resource and before storing the triplet information,
create, in response to the attribute value identification corresponding to the attribute value of the resource not being found, the attribute value identification and record a correspondence relationship between the attribute value identification and the attribute value of the resource.

15. The apparatus of claim 10, wherein the storage and processing module is configured to, after the receiving module receives the RDF data to be stored,
determine a type of the RDF data to be stored; and
store identification information of the type corresponding to the triplet information.

16. The apparatus of claim 10, wherein the storage and processing module is configured to at least one of search for the resource identification corresponding to the resource name of the resource and the first namespace searching for a first namespace identification corresponding to the first namespace, and searching for a resource identification corresponding to the resource name of the resource and the first namespace identification; or search for the attribute identification corresponding to the attribute of the resource and the second namespace by searching for a second namespace identification corresponding to the second namespace, and searching for an attribute identification corresponding to the second namespace identification and the attribute of the resource.

17. An apparatus for storing data, the apparatus comprising:
   a processor; and
   a memory coupled to the processor, the memory storing executable instructions that, when executed by the processor, cause the processor to at least
      receive Resource Description Framework (RDF) data to be stored,
      obtain triplet information from the RDF data to be stored, the triplet information including at least a resource name of a resource, an attribute of the resource, and an attribute value of the resource represented by the RDF data to be stored,
      obtain, from the RDF data to be stored, a first namespace usable by the resource name of the resource,
      search for a resource identification corresponding to the resource name of the resource and the first namespace,
      obtain, from the RDF data to be stored, a second namespace usable by the attribute of the resource,
      search for an attribute identification corresponding to the attribute of the resource and the second namespace,
      determine whether a length of the attribute value of the resource is greater than a threshold value,
      search for an attribute value identification corresponding to the attribute value of the resource in response to determining that the length of the attribute value of the resource is greater than the threshold value, and
      store the triplet information in the memory, wherein
         the resource name of the resource is represented by the resource identification,
         the attribute of the resource is represented by the attribute identification,
         the attribute value of the resource is represented by the attribute value identification in case the length of the attribute value of the resource is greater than the threshold value, and
         the attribute value is directly stored in case the length of the attribute value of the resource is less than or equal to the threshold value.

18. The apparatus of claim 17, wherein the memory stores executable instructions that, when executed by the processor, cause the processor to
   determine a type of the RDF data to be stored; and
   store identification information of the type corresponding to the triplet information.

19. The apparatus of claim 17, wherein at least one of:
   the memory stores executable instructions that, when executed by the processor, cause the processor to search for a resource identification corresponding to the resource name of the resource and the first namespace by searching for a first namespace identification corresponding to the first namespace, and searching for a resource identification corresponding to the first namespace identification and the resource name of the resource; or
   the memory stores executable instructions that, when executed by the processor, cause the processor to search for the attribute identification corresponding to the attribute of the resource and the second namespace by searching for a second namespace identification corresponding to the second namespace, and searching for an attribute identification corresponding to the second namespace identification and the attribute of the resource.

* * * * *